United States Patent
Ushijima (10) Patent No.: US 8,824,734 B2
(45) Date of Patent: Sep. 2, 2014

(54) DEVICE, METHOD AND RECORDING TO DETERMINE DEPRESSED PORTIONS OF IMAGE REGIONS USING SHORTCUT LINE ANALYSIS

(75) Inventor: Satoru Ushijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 13/524,121

(22) Filed: Jun. 15, 2012

(65) Prior Publication Data

US 2013/0004019 A1    Jan. 3, 2013

(30) Foreign Application Priority Data

Jun. 30, 2011    (JP) ................................. 2011-145414

(51) Int. Cl.
*G06K 9/00*    (2006.01)

(52) U.S. Cl.
USPC ........................................................ 382/103

(58) Field of Classification Search
None
See application file for complete search history.

(56) References Cited

U.S. PATENT DOCUMENTS

| | | |
|---|---|---|
| 5,159,645 A | 10/1992 | Kumagai |
| 2003/0198372 A1 | 10/2003 | Touzawa et al. |
| 2007/0286493 A1* | 12/2007 | Liu et al. ................. 382/203 |

FOREIGN PATENT DOCUMENTS

| | | |
|---|---|---|
| JP | 1-68889 | 3/1989 |
| JP | 1-284984 | 11/1989 |
| JP | 8-89503 | 4/1996 |
| JP | 2000-107183 | 4/2000 |
| JP | 2010-224875 | 10/2010 |

* cited by examiner

*Primary Examiner* — Nirav G Patel
(74) *Attorney, Agent, or Firm* — Staas & Halsey LLP (57) ABSTRACT

An image recognition device includes a processor, and a memory coupled to the processor, wherein the processor executes a process includes detecting a plurality of contour points arranged on a contour line of a given region in an image, detecting a first contour point and a second contour point, in the contour points, the first and second contour points corresponding to respective ends of a first shortcut line formed by connecting portions of the contour line across an external area of the given region, and determining, based on a length of the first shortcut line or a length of a first route that extends along the contour line between the first and second contour points, whether or not a portion surrounded by the first shortcut line and the first route, not contained in the given region, is a depressed portion.

8 Claims, 10 Drawing Sheets

| DIRECTION | OPPOSITE CONTOUR POINT NUMBER |
|---|---|
| 0 | 38 |
| 1 | 0 |
| 2 | 0 |
| 3 | 0 |
| 4 | 0 |
| 5 | 0 |
| 6 | 48 |
| 7 | 43 |

DEVICE, METHOD AND RECORDING TO DETERMINE DEPRESSED PORTIONS OF IMAGE REGIONS USING SHORTCUT LINE ANALYSIS

CROSS-REFERENCE TO RELATED APPLICATION

This application is based upon and claims the benefit of priority of the prior Japanese Patent Application No. 2011-145414, filed on Jun. 30, 2011, the entire contents of which are incorporated herein by reference.

FIELD

The embodiments discussed herein are related to an image recognition device, an image recognition method, and a recording medium for an image recognition program.

BACKGROUND

Hitherto, image techniques for detecting a photographic subject reflected to the picture have been studied. In case that an image recognition device detects a subject in an image, various processes that are suitable for the subject may be applied to the image. For example, the image recognition device may make the subject more visible by converting the tones of the image in accordance with the subject, or trim the subject area from the image.

Preferably, a subject is known in advance, in order to detect it precisely. This is because when a subject is known, an image recognition device may detect this subject from an image by making use of information regarding the characteristics of the subject, such as a shape, color and texture. In fact, however, an image recognition device may detect an unknown subject. In this case, it is difficult for the image recognition device to recognize what a subject is, and to discriminate between a subject area and the other area in an image.

Meanwhile, techniques have been proposed which detect a region containing a specific shape, such as a partially depressed portion, in order to detect a subject in an image. For example, an image processing device for medical diagnosis extracts a boundary corresponding to a contour of a target organ, as a contour line. Then, this image processing device corrects the shape of the contour line, and acquires it as a contour line of the target organ. When correcting the shape of the contour line, in case of finding a concave inflection point located between two convex inflection points, the image processing device removes a portion between the convex inflection points, as a depressed portion. Moreover, for example, an organ volume measurement device designates six points on a boundary of an organ, as initial points, and extracts the boundary on the basis of these points. Then, the organ volume measurement device sets boundary existing regions on each organ cross section successively from the result of extracting the boundary, and extracts boundaries therein. When extracting the boundaries, the organ volume measurement device detects a depressed portion on the boundary of the organ, on the basis of a positional relationship of the adjacent points on the boundary.

Moreover, for example, an image analysis device extracts, from an image containing a target region, a segment of a boundary of the target region which corresponds to a depressed portion. This image analysis device sets target region outside points which are arranged along the boundary at regular intervals and at a predetermined distance away from the boundary in the normal direction thereof. Then, the image analysis device applies weights to points in a circle, the center of which is located at each target region outside point, and detects the most weighted portion as a depressed region.

Moreover, for example, a vectorization method of a figure detects a right-angled part of a recessed portion in sequential pixels on a contour, on the basis of a chain code representing an edge direction of the contour. For example, an image processing method successively tracks a boundary pixel between adjacent enveloped points in a direction from one point to the other point, and estimates a distance between the center of the boundary pixel and a line formed by connecting the adjacent points, thereby detecting a depressed portion.

Unfortunately, the conventional techniques make use of information on a subject to be detected, in order to detect a depressed portion on the contour or boundary of the subject. For example, using information regarding a contour of a subject (target organ) which has a slightly curved segment, the above-described image processing device for medical diagnosis can detect a depressed portion on the contour, on the basis of the change in the curvature of the contour. Accordingly, unless any information regarding a subject is available, it is difficult to apply the above-described techniques to detect the subject in an image. Furthermore, another above-described technique can be applied to detect a right-angled part of a recessed portion, but may be difficult to apply in order to detect a depressed portion on a contour having any given shape. Moreover, another technique has the precondition that enveloped points on a contour of a subject have been detected. Therefore, it is difficult to detect a depressed portion on a contour of a subject in an image when the subject area is unknown.

Examples of related art are discussed in Japanese Laid-open Patent Publication Nos. 08-89503, 2000-107183, 2010-224875, 01-68889, and 01-284984.

SUMMARY

According to an aspect of the invention, an image recognition device includes a processor, and a memory coupled to the processor, wherein the processor executes a process includes detecting a plurality of contour points arranged on a contour line of a given region in an image, detecting a first contour point and a second contour point, in the contour points, the first and second contour points corresponding to respective ends of a first shortcut line formed by connecting portions of the contour line across an external area of the given region, and determining, based on a length of the first shortcut line or a length of a first route that extends along the contour line between the first and second contour points, whether or not a portion surrounded by the first shortcut line and the first route, not contained in the given region, is a depressed portion.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, an image recognition device according to the embodiment will be described, with reference to the accompanying drawings.

The inventor has discovered the fact that a notable subject is highly likely to be present in a depressed portion of a background region in an image.

Figure 1:
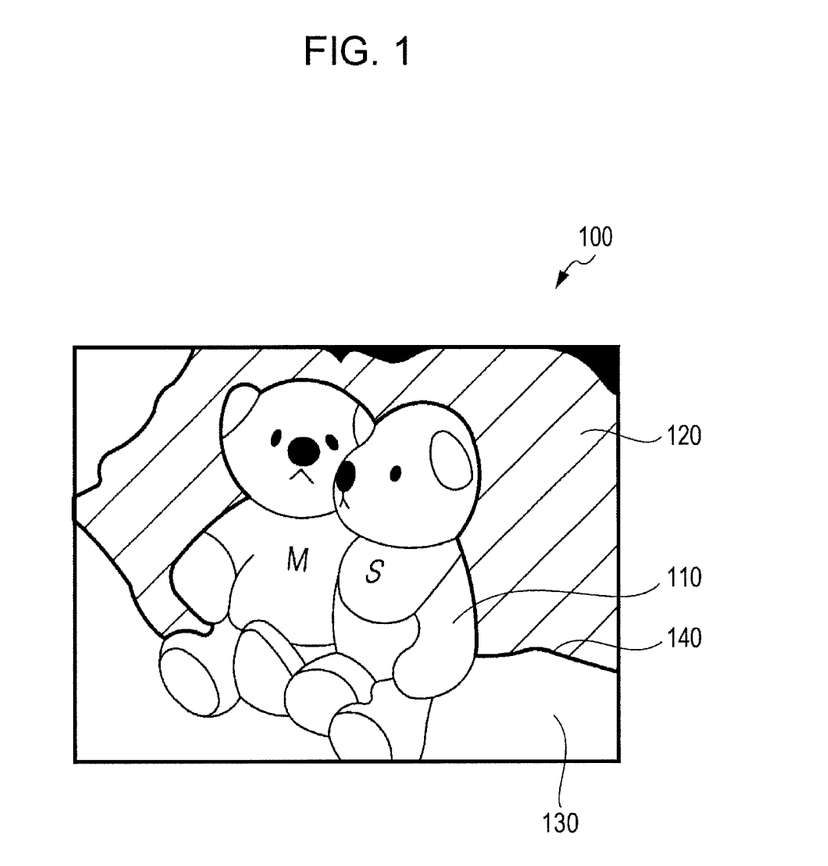
FIG. 1 is a view illustrating an example of an image including a subject region that contains a subject, and background regions that are located around the subject region and do not contain any notable subject.

FIG. 1 is an example of an image including a subject region that contains a subject, and background regions that are located around the subject region and do not contain any notable subject. In more detail, a subject region 110 that contains stuffed animals is located at the center of an image 100, and regions 120 and 130 that do not contain any notable subject are arranged around the subject region 110. Specifically, the region 120 contains a towel hung on the back of a chair against which the stuffed animals lean, and the region 130 contains the seat of the chair and a wall behind the chair. Since neither of the regions 120 and 130 contains any notable subject, any of these regions may be regarded as a background region. However, because the pattern and color of the thing (or the towel) in the region 120 differs from those of things (or the seat of the chair, etc.) in the region 130, the regions 120 and 130 are distinguished from each other as different regions. In this case, in the region 120, the subject region 110 is located at the center of the region 120. Accordingly, the subject region 110 constitutes a deeply depressed portion having an opening on the lower line of the region 120. Meanwhile, a boundary line 140 between the regions 120 and 130 is not straight, and has slightly uneven portions. However, a boundary line having slightly uneven portions, such as the boundary line 140, is less likely to be a boundary between a notable subject and a background region.

The image recognition device according to the embodiment separates an image into at least two regions, and detects a depressed portion in a notable one of the separated regions which is regarded as a background region, such as the region 120 of FIG. 1. In this case, this image recognition device forms a shortest route which has start and end contour points on a contour line of the notable region while passing through an external area of the notable region. Following this, the image recognition device detects a region surrounded by the shortest route between the start and end contour points and a route following the contour line therebetween. Finally, the image recognition device determines whether the detected region is a depressed portion or not.

Figure 2:
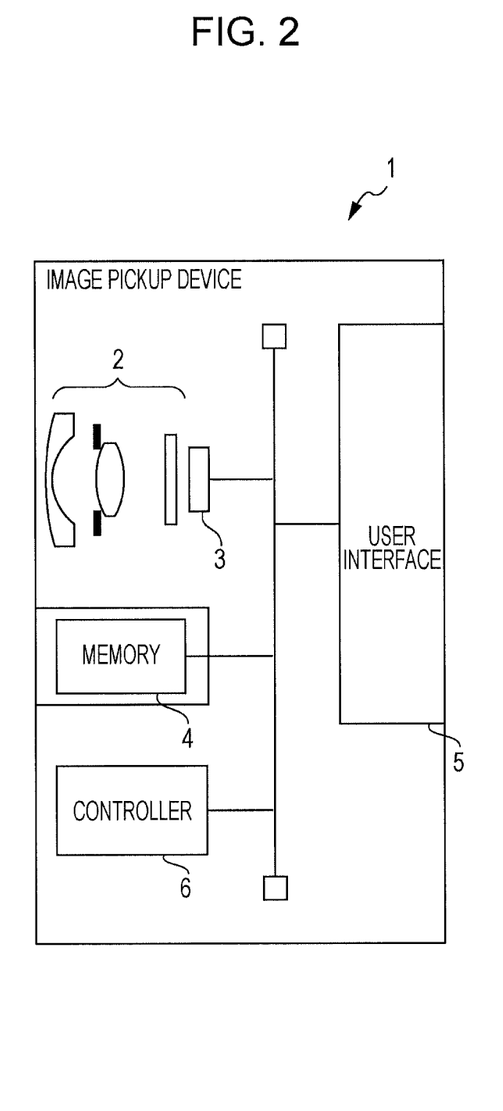
FIG. 2 is a schematic configuration view illustrating an image pickup device equipped with an image recognition device according to the embodiment.

FIG. 2 is a schematic configuration view illustrating an image pickup device equipped with the image recognition device according to the embodiment. This image pickup device 1 includes an image pickup optical system 2, an image sensor 3, a memory 4, a user interface 5, and a controller 6. Note that the image pickup device 1 may be applied to, for example, a digital camera or a portable phone with a built-in camera. In addition, the image pickup device 1 may include a communication interface circuit (not illustrated) for connecting the image pickup device 1 to a communication network or other equipment.

The image pickup optical system 2 forms an image of an object in the image sensor 3. Thus, this image pickup optical system 2 includes, for example, at least one lens. In addition, the image pickup optical system 2 may be a fixed-focal-length lens or a zoom lens.

The image sensor 3 generates an image containing an object formed by the image pickup optical system 2. Thus, the image sensor 3 may be, for example, a charge coupled device (CCD) image sensor or a complementary metal oxide semiconductor (CMOS) image sensor having solid-state image sensing elements arranged in a two-dimensional form. This image sensor 3 may generate an image composed of 300,000, 100,000,000, 200,000,000, 800,000,000, 1,200,000,000, or 1,800,000,000 pixels. In addition, the image sensor 3 may generate a color image having three color components, namely, red (R), green (G) and blue (B) components for each pixel in this embodiment. Each of the color components has a value of, for example, 0 to 255, and the value of each color component increases as the lightness of this color increases. Alternatively, the image sensor 3 may generate a monochrome image, each pixel of which has a lightness value of 0 to 255.

The image sensor 3 outputs the generated image to the controller 6.

The memory 4 includes, for example, a readable and writable volatile or non-volatile semiconductor memory. This memory 4 stores, for example, an image received from the controller 6, and coordinates of pixels on a contour line of a predetermined region in the image, which are detected in order to determine a depressed portion in the region. In addition, the memory 4 may be detachable from the image pickup device 1.

The user interface 5 includes at least one operation switch such as a shutter switch, and a display device such as a liquid crystal display. The user interface 5 outputs a signal in accordance with an operation of the operation switch to the controller 6. This enables a user to move at least one part of the image pickup optical system 2 on the optical axis in order to focus on a predetermined subject, or to cause the image pickup device 1 to take a photograph, through the operation of the user interface 5. In addition, the user can set photographing conditions including a shutter speed and an iris, or a size of an image. Furthermore, the user can erase images stored in the memory 4, and output stored images to other equipment connected to the image pickup device 1 through a communication interface (not illustrated).

The controller 6 includes one or more processors and peripheral circuits thereof. This controller 6 is connected to the units in the image pickup device 1 through signal lines, and has control over the whole image pickup device 1. For example, in response to a signal indicating the pressing of the shutter switch from the user interface 5, the controller 6 causes the image pickup device 1 to take a photograph under a preset photographing condition, and receives an image from the image sensor 3.

The controller 6 is an example of the image recognition device. This controller 6 separates an image acquired from the image sensor 3 into at least two regions, and detects a depressed portion in one of the regions. Then, the controller 6 displays, for example, a rectangle circumscribing the depressed portion on the display device, together with the image. Alternatively, the controller 6 may analyze the distribution of pixel values in the depressed portion, and subject the whole image to processing according to this distribution. For example, the controller 6 may detect the maximum and minimum lightness values among the lightness values in the depressed portion, and subject the whole image to tone conversion processing such that the maximum and minimal values become preset first and second lightness values, respectively.

Figure 3:
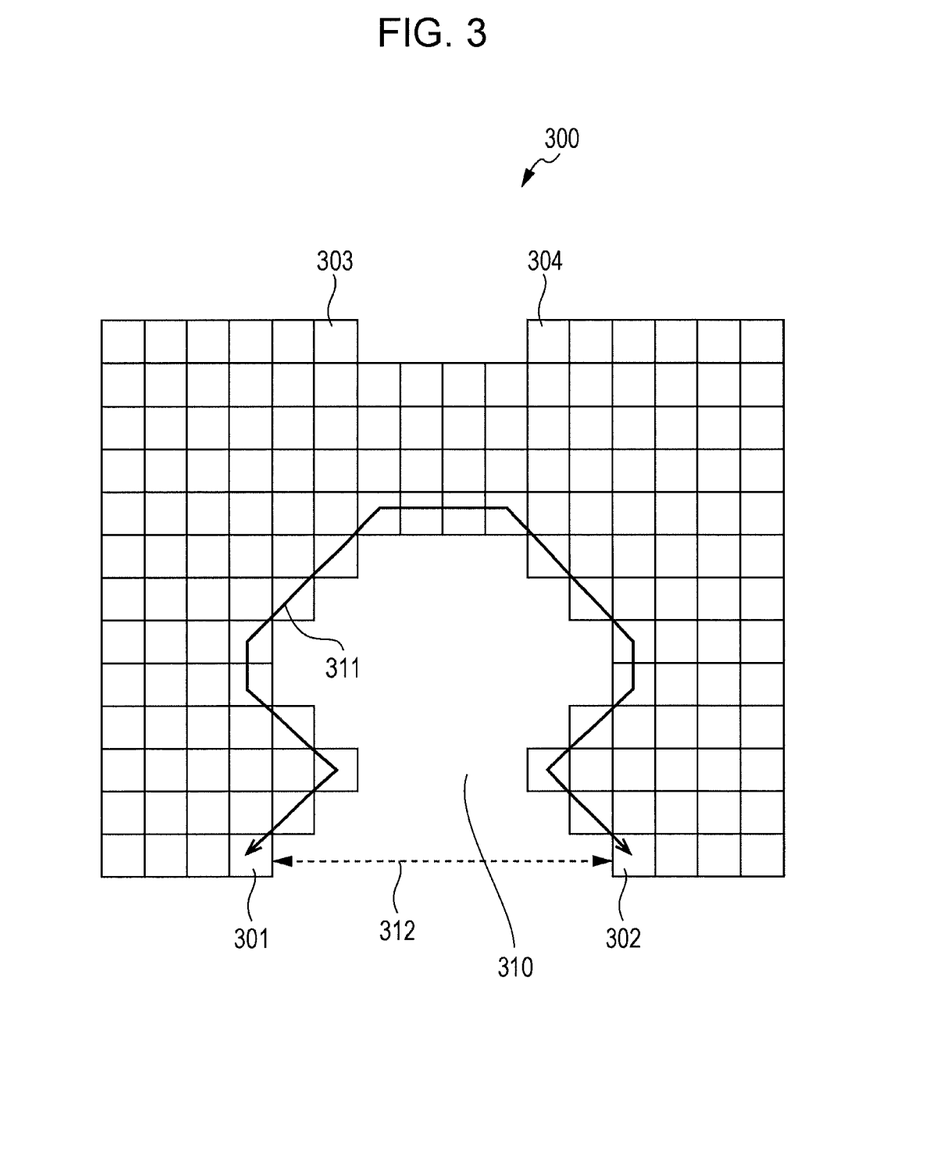
FIG. 3 is a view illustrating an example of a depression of a notable region in an image.

FIG. 3 is a view illustrating an example of a region that is regarded as a background region in a part of an image acquired from the image sensor 3, which is used to explain a depressed portion to be detected. Each cell in a region 300 illustrated in FIG. 3 represents a pixel. A depressed portion 310 that is recessed between two pixels 301 and 302 exists in the lower side of the region 300. If the region 300 is a background in the image, it is considered that any subject exists in the depressed portion 310. For this reason, the controller 6 detects a portion having a shape similar to the depressed portion 310.

As to a contour line 311 that extends between the pixels 301 and 302 so as to surround the depressed portion 310, the length between these pixels is longer than a shortest line 312 formed by connecting the pixels across an external area of the region 300. In addition, this shortest line 312 is located closer to a rectangle circumscribing the region 300 than the contour line 311 is. Meanwhile, the region 300 is also slightly recessed between pixels 303 and 304 arranged on the upper contour of the region 300. However, since a slightly depressed portion contains only a few pixels, this portion is less likely to contain an important part of a subject. Accordingly, such a slightly depressed portion does not need to be detected. Note that in this slightly depressed portion, the length of a contour line between the pixels 303 and 304 that form an opening is substantially equal to that of a shortest line therebetween.

Therefore, the controller 6 detects two points on a contour which form an opening of a depressed portion, and then, detects a depressed portion in the region, on the basis of the lengths of a shortest route between these points and a contour line therebetween.

Figure 4:
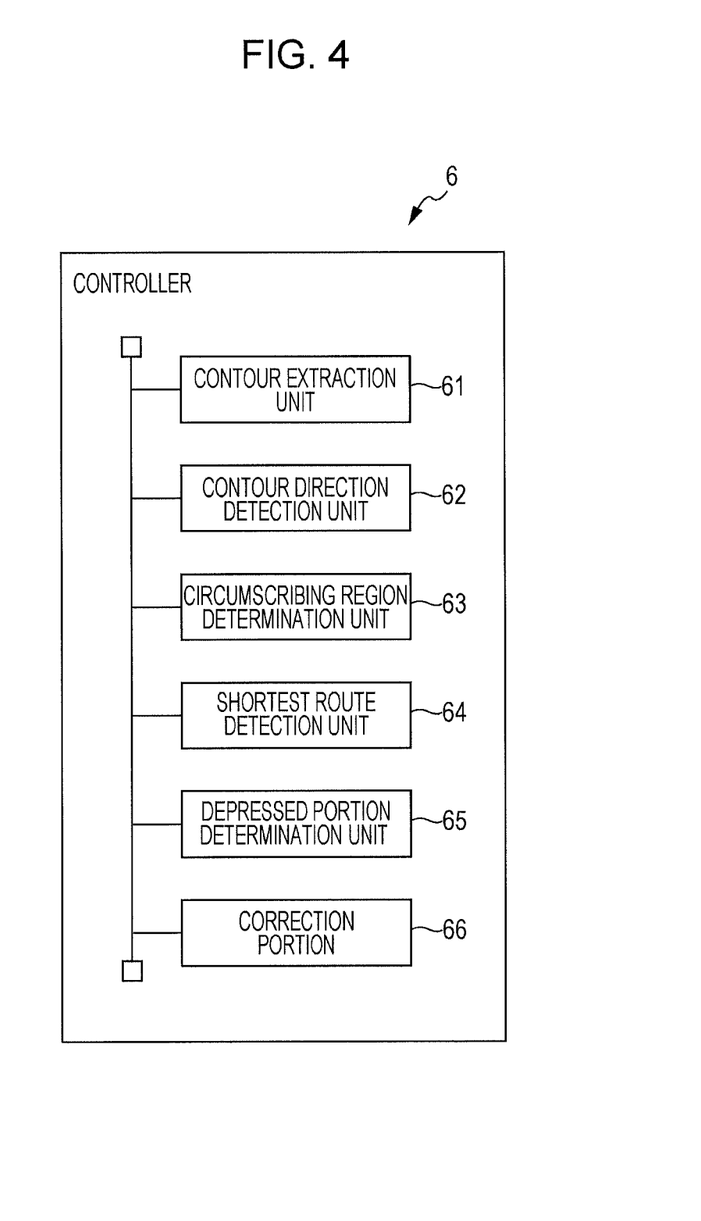
FIG. 4 is a functional block diagram of a controller implementing the image recognition device.

FIG. 4 is a functional block diagram of the controller 6 that functions as the image recognition device. The controller 6 includes a contour extraction unit 61, a contour direction detection unit 62, a circumscribing region determination unit 63, a shortest route detection unit 64, a depressed portion determination unit 65, and a correction unit 66.

The above units of the controller 6 constitute a functional module that is implemented by a computer program, which is run by a processor in the controller 6. Alternatively, the units of the controller 6 are implemented by a single integrated circuit built in the controller 6 which integrates circuits corresponding to these units.

The contour extraction unit 61 separates a whole image acquired from the image sensor 3 into at least two regions, and detects a contour in a notable one of the separated regions. First, for example, the contour extraction unit 61 converts the pixel values of the image into respective binary values, thereby separating the image into two regions. In this case, the contour extraction unit 61 converts a color component value for each pixel in the image into a value of the HSV or HLS colorimetric system, and calculates the average of the lightness or brightness value at each pixel, as a binary threshold. Note that if the image is a monochrome image, the conversion process of the colorimetric system may be omitted. Then, the contour extraction unit 61 separates the image into high and low lightness regions: the high lightness region is a cluster made up of pixels having lightness or brightness equal to or more than the binary threshold; and the low lightness region that is a cluster made up of pixels having lightness or brightness less than the binary threshold.

Alternatively, the contour extraction unit 61 may define, as a region, a cluster made up of pixels having a value falling within a predetermined range, and as another region, a cluster made up of pixels having a value falling outside the predetermined range. In this case, the predetermined range is preset in accordance with, for example, an assumed background. In addition, the pixel value may be, for example, a hue or chroma in the HSV or HLS colorimetric system, or any of the color component values in the RGB colorimetric system.

Moreover, the contour extraction unit 61 sets any given pixel in the image, such as a pixel located at the upper left edge of the image, as a target pixel. Then, the contour extraction unit 61 selects, from pixels arranged adjacent to the target pixel, a pixel having a value that does not differ from that of the target pixel by more than a predetermined range, and connects this pixel to the target pixel. Note that the predetermined range is set to be the maximum of the difference between pixel values which is allowed to be regarded as the same object image. The contour extraction unit 61 sets the pixel connected to the target pixel, as a next target pixel, and repeats the same processing. Then, the contour extraction unit 61 sets a cluster of the pixels connected to one another, as a first region. Furthermore, the contour extraction unit 61 may also set any given pixel located outside the first region, as another target pixel, and repeats the above processing, thereby separating the image into multiple regions.

Alternatively, the contour extraction unit 61 may separate the image into multiple regions using an image separation method. For example, the contour extraction unit 61 may classify values for pixels in an image into multiple groups in accordance with a clustering method called the "k-means method", and set a cluster of the pixels belonging to each of the groups, as a single region.

Moreover, after separating the image into multiple regions, the contour extraction unit 61 may subject at least one of the regions to Morphological dilation and erosion or erosion and dilation calculation processing, in order to remove any isolated pixel. Furthermore, the contour extraction unit 61 may subject individual regions to labeling processing, thereby setting each of these sub-regions as an independent region when detecting multiple sub-regions arranged separately from one another.

The contour extraction unit 61 selects a notable one from the separated regions and sets it as a notable region. For example, the contour extraction unit 61 selects, from the separated regions, a region that is the most likely to be a background region, and sets the selected region as a notable region. Accordingly, for example, the contour extraction unit 61 determines the dispersion of the pixel values in each region, and sets the region having the smallest dispersion value as a notable region. Alternatively, the contour extraction unit 61 may determine the average of the pixel values in each region, and set, as a notable region, a region having the average closest to a reference value being preset in accordance with an assumed background. In this case, the pixel value may also represent lightness, brightness, hue or chroma, or be any of color component values in the RGB colorimetric system. Moreover, the contour extraction unit 61 may determine the number of pixels in each region, namely, an area thereof, and set the region having the maximum area, as a notable region.

After determining the notable region, the contour extraction unit 61 detects pixels on a contour line in the notable region. Accordingly, the contour extraction unit 61 sets the individual pixels in the notable region sequentially, as a target pixel. Following this, the contour extraction unit 61 determines whether or not a pixel that is located adjacent to any of the upper, lower, right and left sides of the target pixel is contained in a region different from the notable region. If this adjacent pixel is contained in a different region, the contour extraction unit 61 determines that this target pixel is located on the contour line. Otherwise, if all of the adjacent pixels are contained in the notable region, the contour extraction unit 61 determines that this target pixel is not located on the contour line. Note that even if a target pixel is located at the edge of the image, the contour extraction unit 61 may also determine that this target pixel is located on the contour line in the notable region. Furthermore, the contour extraction unit 61 may determine whether or not a pixel that is located adjacent to any of the oblique sides of the target pixel is contained in a region different from the notable region, in addition to a pixel located adjacent to any of the upper, lower, right and left sides thereof. In this case, if any of eight adjacent pixels is contained in a region different from the notable region, the contour extraction unit 61 may determine that this target pixel is located on the contour line in the notable region. Thereafter, a pixel located on a contour line in a notable region is referred to as a "contour point", for the sake of convenience.

Finally, the contour extraction unit 61 stores the coordinates of each contour point in the memory 4.

The contour direction detection unit 62 determines, at each contour point in the notable region, the direction of the contour line near the contour point. For example, the contour direction detection unit 62 refers to the coordinates of each contour point stored in the memory 4, and sets the contour point located at the upper left edge of the notable region, as a notable contour point. Subsequently, the contour direction detection unit 62 sets the identification number of this notable contour point to "1". The contour direction detection unit 62 determines whether or not each of pixels arranged adjacent to the notable contour point is a contour point. This determination is performed clockwise from the upper pixel. The contour direction detection unit 62 sets a direction from the notable contour point to the adjacent contour point detected first, as a contour line direction for this notable contour point. The contour direction detection unit 62 sets the detected contour point as a next notable contour point, and sets the identification number of the next contour point to a value obtained by adding "1" to the identification number of the previous notable contour point. Then, the contour direction detection unit 62 detects a contour point located adjacent to the next notable contour point, except for the previous notable contour point, and sets a direction from the next contour point to this adjacent contour point, as a contour line direction for the next contour point. The contour direction detection unit 62 repeats the above processing, until the contour point that has already been set as a notable contour point is detected as a contour point located adjacent to a current notable contour point. Accordingly, the identification number of a contour point that has been detected as the last notable contour point represents the total number of contour points, namely, the whole length of the contour line.

Figure 5A:
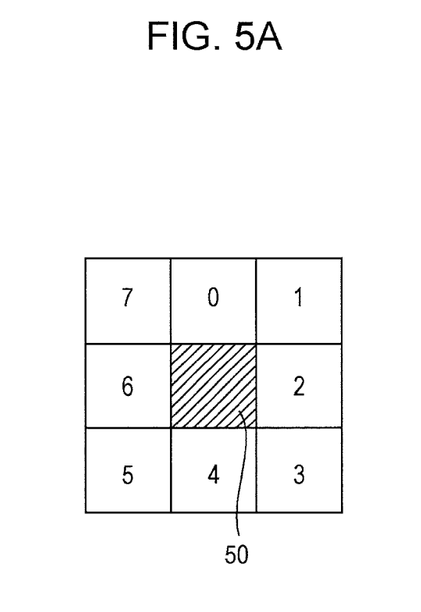
FIG. 5A is a view illustrating a relationship between pixels arranged around any given pixel on a contour line and the numbers of contour line directions of this pixel.
Figure 5B:
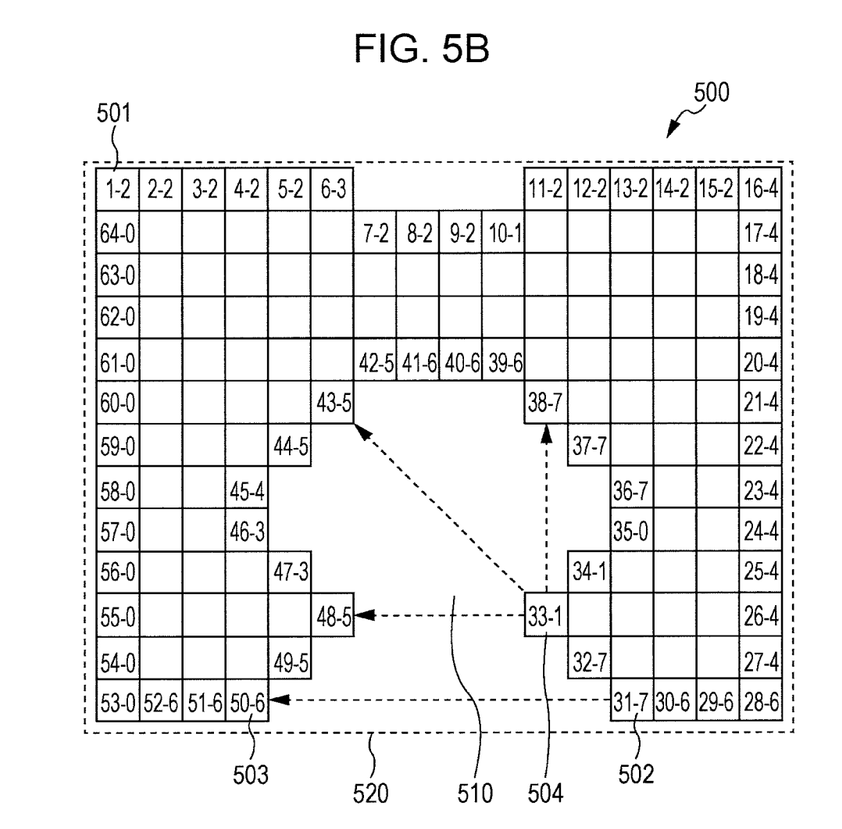
FIG. 5B is a view illustrating the contour line direction and number of each pixel on the contour line in the region illustrated in FIG. 3.

FIG. 5A illustrates a relationship between pixels that are arranged adjacent to a notable contour point and numbers that indicate the direction of a contour line. FIG. 5B illustrates a contour line direction determined for each contour point in the region illustrated in FIG. 3.

As illustrated in FIG. 5A, numbers "0" to "7", each of which indicates a contour line direction for a pixel, are assigned to respective pixels arranged adjacent to a notable contour point 50. For example, the contour line direction number "0" is assigned to the pixel located adjacent to the upper side of the notable contour point, and this number is incremented by "1" in the clockwise direction.

FIG. 5B illustrates a region 500 having multiple contour points, and an identification number and a contour line direction number are depicted on the left and right sides, respectively, of each contour point. For example, a contour point 501 located at the upper left edge has an identification number "1", and its contour line direction number is "2" because another contour point is located adjacent to the right side of the contour point 501. Furthermore, for example, since a contour point 502, which is one of two contour points arranged across an opening of a depressed portion 510, is the thirty-first one with respect to the contour point 501, the identification number thereof is "31". In addition, since the next contour point is located adjacent to the upper left of the contour point 502, the identification number thereof is "7". Meanwhile, since a contour point 503, which is the other of the contour points arranged across the opening of the depressed portion 510, is the fiftieth one with respect to the contour point 501, the identification number thereof is "50". In addition, since the next contour point is located adjacent to the left of the contour point 503, the identification number thereof is "6". In this example, the whole length of the contour line is substantially equal to the total length of sixty four pixels.

Finally, the contour direction detection unit 62 stores the coordinates, identification number, and contour line direction number of each contour point in the memory 4.

The circumscribing region determination unit 63 determines a rectangle circumscribing the notable region. Specifically, the circumscribing region determination unit 63 selects a contour point located at the left edge from all the contour points in the notable region, and sets a lateral coordinate of the selected contour point, as a left edge coordinate of a circumscribing rectangle. In addition, the circumscribing region determination unit 63 selects a contour point located at the right edge from all the contour points in the notable region, and sets a lateral coordinate of the selected contour point, as a right edge coordinate of the circumscribing rectangle. Similarly, the circumscribing region determination unit 63 selects respective contour points located at the upper and lower edges from all the contour points in the notable region, and sets respective vertical coordinates of the selected contour points, as upper and lower edge coordinates of the circumscribing rectangle.

In this case, the circumscribing region determination unit 63 may rotate the notable region in steps of, for example, an angle of 5° by making use of a known transformation method such as the affine transformation, and determines a circumscribing rectangle and an area thereof at each angle step. Further, the circumscribing region determination unit 63 may set, as a rectangle circumscribing the notable region, a circumscribing rectangle determined at an angle where its area is minimal.

The circumscribing region determination unit 63 stores the coordinates at four corners of the detected circumscribing rectangle in the memory 4. Alternatively, the circumscribing region determination unit 63 may store the respective inclinations and intercepts of the four boundary lines composing the circumscribing rectangle in the memory 4.

The shortest route detection unit 64 selects two contour points from the contour points, which correspond to both ends of a shortest route formed by connecting two portions of the contour line across an external area of the notable region. In order to do this, the shortest route detection unit 64 sequentially sets the individual contour points as a notable contour point, and forms straight lines which extend from this notable contour point towards an external area of the notable region. If one of the straight lines intersects the contour line, the shortest route detection unit 64 regards this line as a shortest route. Further, the shortest route detection unit 64 detects a contour point at which the shortest route intersects the contour line, as an opposite contour point. The opposite and notable contour points correspond to respective ends of the shortest route.

First, the shortest route detection unit 64 sets a search direction range, which corresponds to an inclination range of a straight scanning line for searching for an opposite contour point for each contour point. Specifically, the shortest route detection unit 64 sets the search direction range, for example, so as to be sandwiched between two directions from the notable contour point to respective adjacent contour points, and to include directions from the notable contour point toward an external area of the notable region. Referring to FIGS. 5A and 5B again, for example, a search direction range for the contour point 502 is set to include the directions denoted by numbers "3" to "6", which are between directions from the notable contour point to respective contour points having the identification numbers "30" and "32" arranged clockwise. Similarly, a search direction range for the contour point 503 is set to include the directions denoted by numbers "2" to "5", which are between directions from the notable contour point to respective contour points having the identification numbers "49" and "51" arranged clockwise. Furthermore, a search direction range for the contour point 504 of the identification number "33" is set to include the directions denoted by numbers "4" to "7" and "0", which are between directions from the notable contour point to respective contour points having the identification numbers "32" and "34" arranged clockwise.

Next, the shortest route detection unit 64 forms straight scanning lines in all the directions within the search direction range for each notable contour point. Subsequently, the shortest route detection unit 64 determines whether or not individual pixels on each straight scanning line are another contour point in the notable region, in ascending order of a distance from the notable contour point. Then, if one of the pixels on any straight scanning line is another contour point in the notable region, the shortest route detection unit 64 regards this straight scanning line as a shortest route. In addition, the shortest route detection unit 64 sets a contour point detected on the straight scanning line, as an opposite contour point for the notable contour point, and stores the opposite contour point in relation to the search direction and the notable contour point, in the memory 4. Meanwhile, if the straight scanning line intersects any of the sides composing the rectangle circumscribing the notable region before another contour point is detected on the straight scanning line in any search direction, the shortest route detection unit 64 determines that no opposite contour points are present in this search direction. Specifically, there are no shortest routes extending from the notable contour point in this search direction.

Referring to FIG. 5B again, for example, respective straight scanning lines extending from the contour point 502 in the directions "3" to "5" intersect a lower side 520 of the circumscribing rectangle, before another contour point is detected thereon. Thus, there are no opposite contour points in these directions. Meanwhile, the contour point 503 is located on a straight scanning line extending from the contour point 502 in the direction "6", or in the lateral direction therefrom. Consequently, for the contour point 502, the identification number "50" of the opposite contour point 503 is stored in the memory 4, in relation to the direction "6".

Moreover, respective straight scanning lines extending from the contour point 504 of the identification number "33" in the directions "4" to "5" intersect the lower side 520 of the circumscribing rectangle, before another contour point is detected thereon. Thus, there are no opposite contour points in these directions. Meanwhile, the contour point of the identification number "48" is located on a straight scanning line extending from the contour point 504 in the direction "6". Similarly, the contour points of the identification numbers "43" and "38" are located on straight scanning lines extending in the directions "7" and "0", respectively. Consequently, for the contour point 504, the opposite contour points of the identification numbers "48", "43" and "38" are stored in the memory 4, in relation to the directions "6", "7" and "0", respectively.

Figure 6:
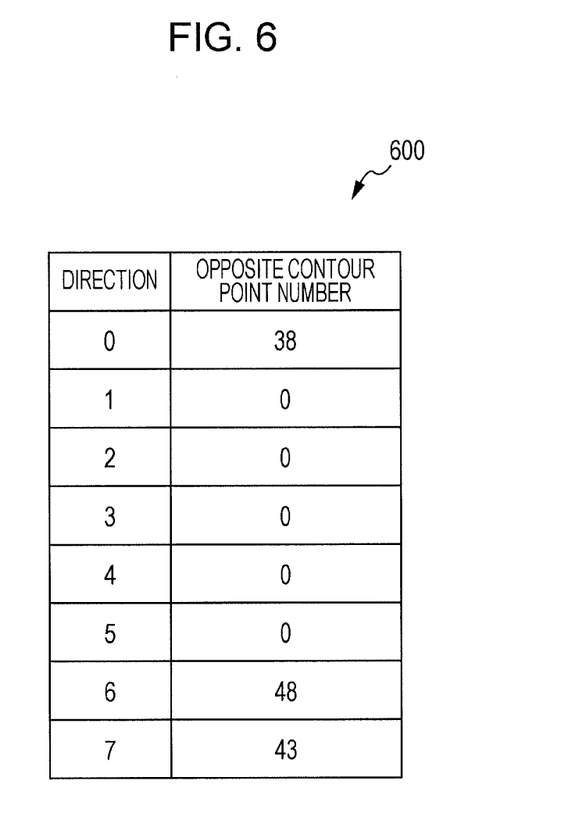
FIG. 6 is a view illustrating an example of a numbered list of opposite contour points which is set for each contour point.

FIG. 6 illustrates an example of a numbered list of opposite contour points, which is set for each contour point and stored in the memory 4. The numbered list of opposite contour points illustrated in FIG. 6 corresponds to the contour point 504 illustrated in FIG. 5B. The numbered list of opposite contour points 600 indicates shortest route directions on the left column, and identification numbers of opposite contour points in the corresponding directions on the right column. As illustrated in FIG. 6, the respective opposite contour points for the contour point 504 are detected in the directions "6", "7" and "0". Accordingly, in the numbered list of opposite contour points 600, the identification numbers "48", "43" and "38" of the opposite contour points are stored in the rows of the directions "6", "7" and "0", respectively. Since no opposite contour point is located in the other directions, a number that is different from the identification number of any contour point, such as "0", is stored.

In the above embodiment, the search direction is any of the eight directions being set in steps of an angle of 45°, as illustrated in FIG. 5A, but the setting step of the search directions may be smaller than an angle of 45°. For example, the search direction may be set in step of an angle of 15°, 22.5° or 30°.

The depressed portion determination unit 65 detects a portion that is not contained in a notable region and that is surrounded by a shortest route between a contour point and an opposite contour point and a contour line therebetween in the notable region. Then, the depressed portion determination unit 65 determines whether the detected portion is a depressed portion or not.

Figure 7:
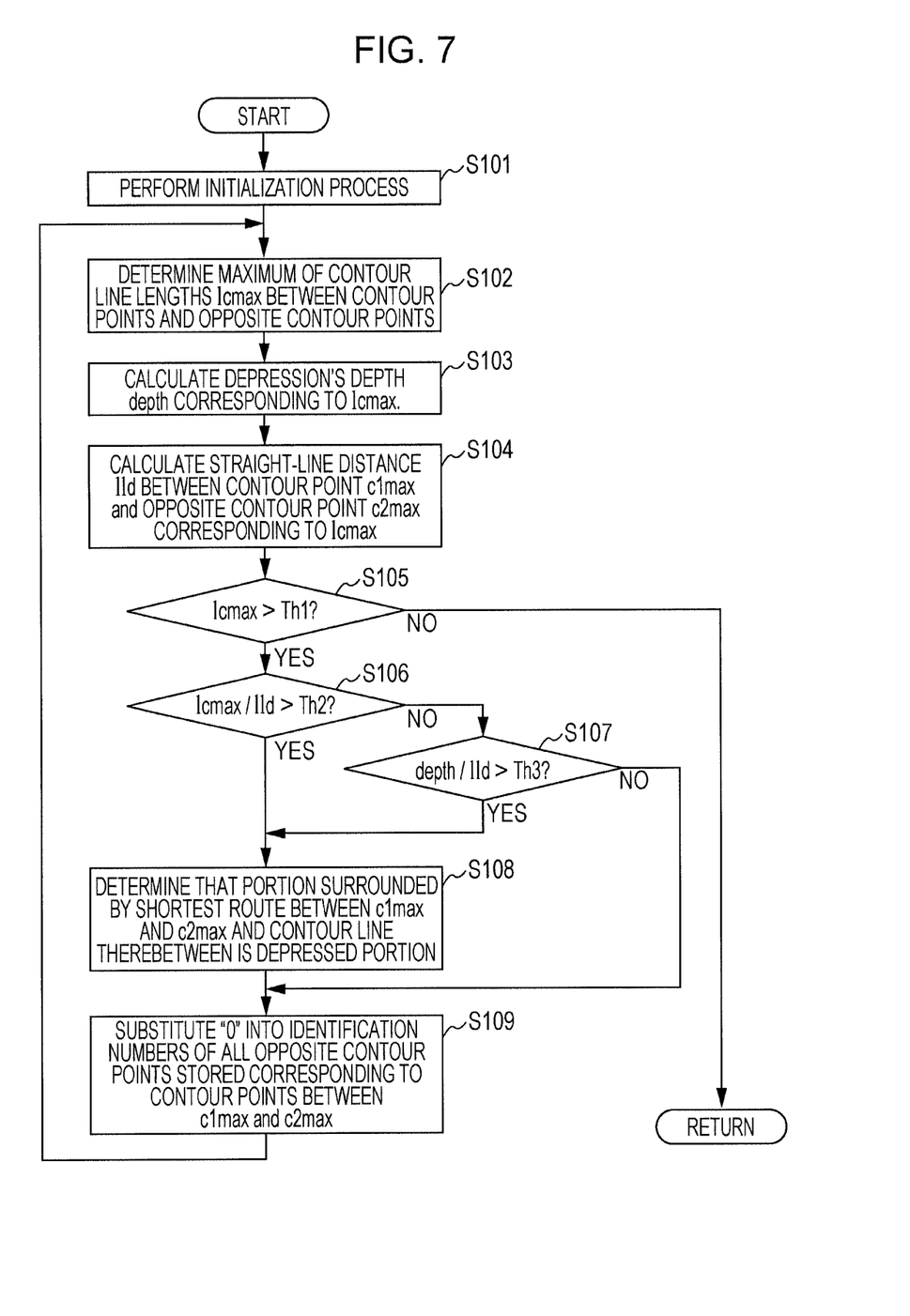
FIG. 7 is a method depicting operations of a depressed portion determination unit in the controller during depression determination processing.

FIG. 7 is a method depicting operations of the depressed portion determination unit 65 during depression determination processing.

At Step S101, the depressed portion determination unit 65 performs initialization processing. Specifically, the depressed portion determination unit 65 sets parameters, including a maximum of contour line lengths (lcmax) between contour points and corresponding opposite contour points, a straight-line distance (lld) therebetween, and a depression's depth (depth), to "0". After that, the depressed portion determination unit 65 determines a contour line length between each of notable contour points and an opposite contour point detected therefor while sequentially exchanging the notable contour points. At Step S102, the depressed portion determination unit 65 determines the maximum of the contour line lengths (lcmax). Note that a contour line length between a contour point and an opposite contour point is expressed by an absolute value of a difference between the identification numbers of the contour point and the opposite contour point. However, if there is the contour point having the maximum identification number between the contour point and the opposite contour point, the contour line length is expressed by an absolute value obtained by adding the maximum identification number to a smaller one of both identification numbers and subtracting the larger one from the added result. A contour point (c1max) and an opposite contour point (c2max) that correspond to the maximum of the contour line lengths (lcmax) are a candidate for edge points arranged across an opening in a depressed portion. Accordingly, the depressed portion determination unit 65 stores the identification numbers of the contour point (c1max) and the opposite contour point (c2max) in the memory 4. Referring to the example illustrated in FIG. 5B, for example, the contour line length between the contour points 502 and 503 has the maximum value (50-31=19). Therefore, the identification numbers "31" and "50" of the contour points 502 and 503, respectively, are stored in the memory 4.

At Step S103, the depressed portion determination unit 65 calculates a depression's depth (depth) corresponding to the maximum of the contour line lengths (lcmax). Subsequently, for example, the depressed portion determination unit 65 selects contour points (thereafter, referred to as "middle contour points" for the sake of convenience) between the contour point (c1max) and the opposite contour point (c2max). Following this, the depressed portion determination unit 65 draws a line normal to the contour line direction at each middle contour point, then draws a straight line between the contour point (c1max) and the opposite contour point (c2max), and determines a distance between each of the middle contour points and a point at which corresponding normal and straight lines intersect each other. Finally, the depressed portion determination unit 65 sets the maximum of the distances between the middle contour points and the corresponding intersecting points, as a depression's depth (depth). In the example illustrated in FIG. 5B, for example, a distance between any one of the contour points having the identification numbers "39" to "42" and a straight line connecting the contour points 502 and 503 (equal to the length of eight pixels) corresponds to a depth (depth). Alternatively, the depressed portion determination unit 65 may set a route that extends, across an external area of the notable region, from each middle contour point to a straight line connecting the contour point (c1max) and the opposite contour point (c2max). Then, the depressed portion determination unit 65 may determine that the minimal number of pixels arranged on each route is a route length. Finally, the depressed portion determination unit 65 may set the maximum of the route lengths as a depression's depth (depth). Note that the depressed portion determination unit 65 may employ any of various shortest route searching methods such as the Dijkstra's shortest route calculation, in order to determine the route length of the depth.

At Step S104, the depressed portion determination unit 65 calculates a length of a shortest route between the contour point (c1max) and the opposite contour point (c2max) which corresponds to the maximum of the contour line lengths (lcmax), namely, a straight-line distance (lld) between the contour point (c1max) and the opposite contour point (c2max). In the example illustrated in FIG. 5B, the straight-line distance (lld) corresponds to a length of a straight line formed by connecting the contour points 502 and 503 (equal to the length of nine pixels).

After that, at Step S105, the depressed portion determination unit 65 determines whether or not the maximum of the contour line lengths (lcmax) exceeds a predetermined threshold (Th1). Note that the threshold (Th1) may be set to, for example, 1/10 of the total number of contour points in the notable region. Alternatively, the threshold (Th1) may be determined on the basis of the number of pixels in the whole image. For example, the threshold (Th1) may be set to the minimal length of a contour line of a depressed portion, which is desirable for image processing according to the analysis result of the pixel values in the detected depressed portion, or to 1/10000 to 1/1000 of the number of pixels in the whole image.

If the maximum of the contour line lengths (lcmax) does not exceed the threshold (Th1) ("No" at Step S105), the depressed portion determination unit 65 considers that the portion between the contour point (c1max) and the opposite contour point (c2max) which correspond to the maximum of the contour line lengths (lcmax) is not a depression. For this reason, the depressed portion determination unit 65 terminates the depression detection processing.

Otherwise, if the maximum of the contour line lengths (lcmax) exceeds the threshold (Th1) ("Yes" at Step S105), the depressed portion determination unit 65 determines whether or not a ratio of the maximum of the contour line lengths (lcmax) to a straight-line distance (lld) between the contour point (c1max) and the opposite contour point (c2max) exceeds a predetermined threshold (Th2), at Step S106. Note that the threshold (Th2) may be set to, for example, 1.5 to 3.

If the ratio (lcmax/lld) does not exceed the threshold Th2 ("No" at Step S106), the depressed portion determination unit 65 determines whether or not a ratio of the depression's depth (depth) to the straight-line distance (lld) exceeds a predetermined threshold Th3, at Step S107. Note that the threshold Th3 may be set to, for example, 0.5 to 1. Then, if the ratio (depth/lld) does not exceed the threshold (Th3) ("No" at Step S107), the depressed portion determination unit 65 determines that the portion between the contour point (c1max) and the opposite contour point (c2max) is not a depression in the notable region. This is because in this case, it is considered that the contour line between the contour point (c1max) and the opposite contour point (c2max) is not sufficiently longer than the shortest route, and the depression formed therebetween is not sufficiently deep.

Otherwise, if the ratio (lcmax/lld) exceeds the threshold (Th2) ("Yes" at Step S106), the depressed portion determination unit 65 determines that a portion which is surrounded by the shortest route between the contour point (c1max) and the opposite contour point (c2max) and a route following the contour line therebetween and which is not contained in the notable region is a depressed portion, at Step S108. Similarly, if the ratio (depth/lld) exceeds the threshold Th3 ("Yes" at Step S107), the depressed portion determination unit 65 determines that the portion which is surrounded by the shortest route between the contour point (c1max) and the opposite contour point (c2max) and the route following the contour line therebetween and which is not contained in the notable region is a depressed portion. Then, the depressed portion determination unit 65 stores the identification numbers and coordinates of the contour points arranged between the contour points (c1max) and the opposite contour point (c2max) in the memory 4, as data representing the detected depressed portion. This is based on the assumption where if the ratio (lcmax/lld) exceeds the threshold (Th2), the contour line between the contour point (c1max) and the opposite contour point (c2max) is relatively longer than the shortest route therebetween, and therefore, the contour line is inwardly curved, sufficiently deviating from the corresponding side of the rectangle circumscribing the notable region. Meanwhile, if the ratio (depth/lld) exceeds the threshold (Th3), it is assumed that an opening of a depression is formed between the contour point (c1max) and the opposite contour point (c2max), the depth of the depression is considered to be relatively greater than the width of the opening, namely, the length of the shortest route.

At Step S109, the depressed portion determination unit 65 substitutes "0" into the identification numbers of all the opposite contour points corresponding to the contour points between the contour point (c1max) and the opposite contour point (c2max). Note that the identification numbers to be substituted is possibly used by, for example, the correction unit 66. Accordingly, preferably, the memory 4 saves these identification numbers as independent data, prior to the substitution. After that, the depressed portion determination unit 65 repeats the subsequent steps to Step S102. This enables the depressed portion determination unit 65 to detect all the depressed portions, even if the notable region has multiple depressed portions.

Note that the depressed portion determination unit 65 may exchange the orders of Step S103 and Step S104. In addition, the depressed portion determination unit 65 may skip the determination at Step S105, and determine whether or not the portion which is surrounded by the shortest route between the contour point (c1max) and the opposite contour point (c2max) and the route following the contour line therebetween is a depressed portion, only on the basis of the determination results of Step S106 and Step S107.

The correction unit 66 corrects the depressed portions detected by the depressed portion determination unit 65, in order to extract more verisimilitude portions from the depressed portions.

Figure 8:
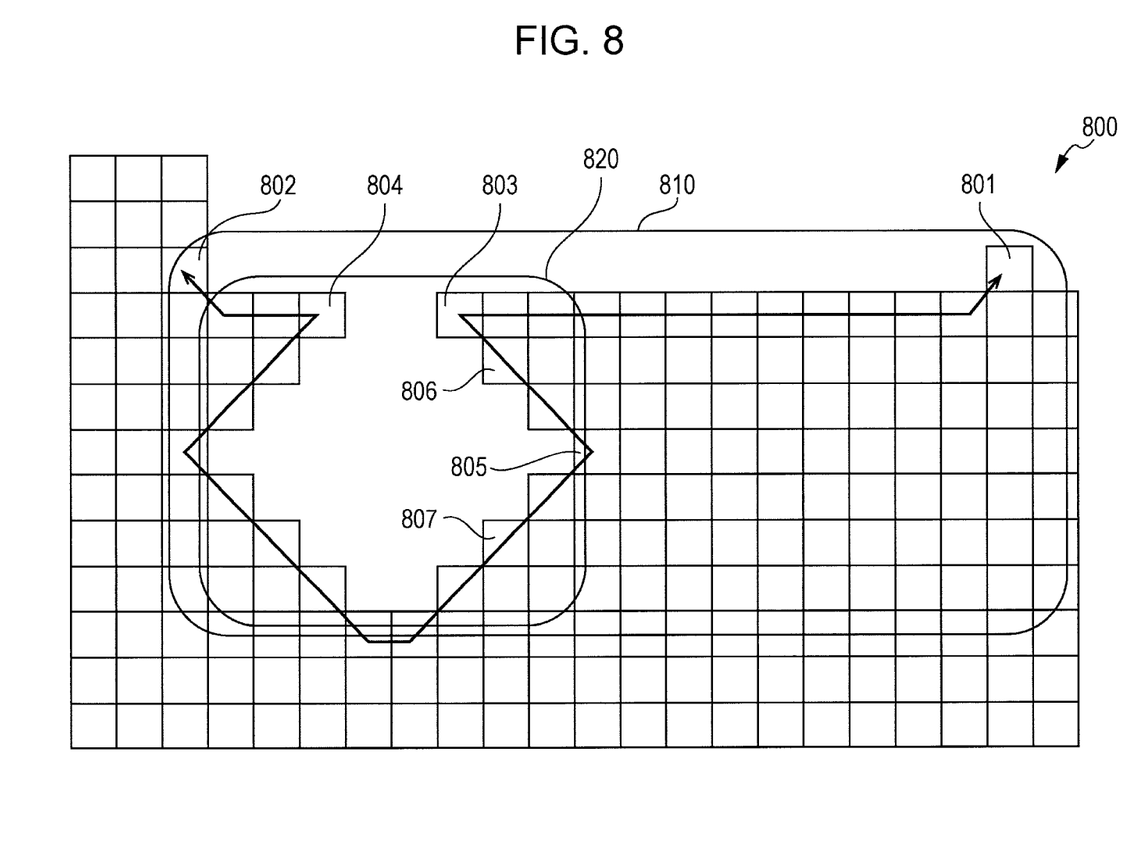
FIG. 8 is a view depicting an example of a detected depressed portion.

An explanation will be given of a case where the correction of the depressed portions is preferred, with reference to FIG. 8. Noise accumulated in an image or a mismatch between a boundary of a subject and a background in an image and a boundary of pixels may generate any unevenness portions on a contour of a notable region which is to be a linear or slowly curved. Referring to an example illustrated in FIG. 8, a notable region 800 contains a contour point 801 having a raised shape. Due to this, the contour extraction unit 61 detects a contour point 802 as an opposite contour point for the contour point 801, and detects a portion 810 between the contour points 801 and 802, which is surrounded by a contour line, as a depressed portion. In fact, however, a portion 820 between the contour points 803 and 804, which is surrounded by a contour line, is obviously more appropriate for a depressed portion. In addition, a ratio of the contour line length between the contour lines 803 and 804 to the shortest route length therebetween is greater than a ratio of the contour line length between the contour lines 801 and 802 to the shortest route length therebetween.

Accordingly, the correction unit 66 first selects contour points arranged between both edges of a contour line surrounding the detected depressed portion. Then, the correction unit 66 determines a shortest route length and contour line length between each selected contour point and an opposite contour point therefor. Finally, the correction unit 66 corrects the detected depressed portion, on the basis of length ratios of the contour lines to the corresponding shortest routes.

Figure 9:
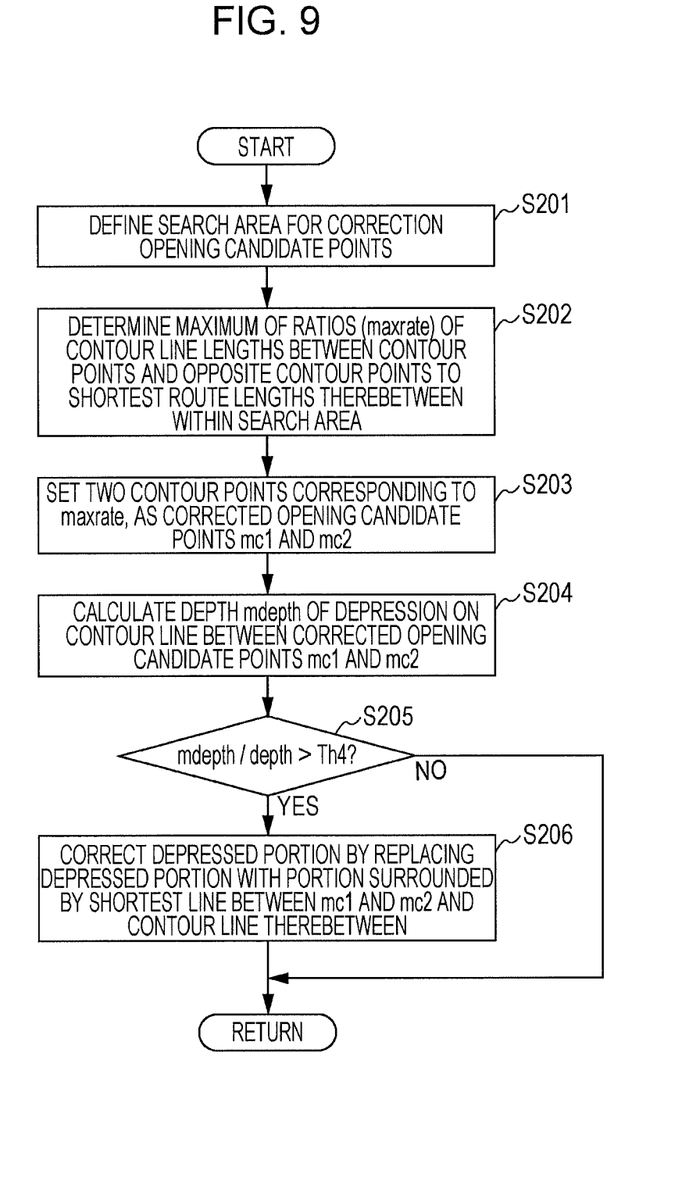
FIG. 9 is a method depicting operations of a correction unit in the controller during depression correction processing.

FIG. 9 is a method depicting operations of the correction unit 66 during depression correction processing. First, at Step S201, the correction unit 66 defines a search area for two contour points (thereafter, referred to as "correction opening candidate points" for the sake of convenience), which are to correspond to the respective edge points across the opening in a corrected portion. Typically, the correction opening candidate points are arranged in the vicinity of an opening in each detected depressed portion. Preferably, accordingly, a portion which is located away from an opening in each detected depressed portion and near the middle of the contour line surrounding the depressed portion is removed from the search area in advance. In order to do this, for example, the correction unit 66 defines the search area by removing a portion having a predetermined length ratio from a contour line in the depressed portion which has the contour points (c1max and c2max) at respective both edges. Note that the portion having a predetermined length is located on a contour line of each detected depressed portion, and its center is located at a middle point of two contour points (c1max and c2max). In addition, the predetermined length may be set to, for example, $\frac{1}{10}$ to $\frac{1}{4}$ of the contour line. Referring to FIG. 8, for example, contour points arranged in the vicinity of the opening in the detected depressed portion correspond to the contour points 801 and 802. In addition, the middle point corresponds to a contour point 805, because a contour line length from the contour point 801 is the same as that from the contour points 802. Furthermore, assuming the predetermined length is $\frac{1}{10}$ of the contour line, since thirty pixels are arranged on a contour line between the contour points 801 and 802, the contour point 805 and respective two adjacent contour points are removed from the search area. In this case, the search area includes both an area that occupies from the contour point 801 to the contour point 806, which is the second contour point located next to the contour point 805, and an area that occupies from the contour point 802 to the contour point 807, which is the second contour point located next to the contour point 805.

The correction unit 66 determines a contour line length between each contour point in the search area and an opposite contour point therefor, and a straight line length that is a length of a shortest route therebetween. At Step S202, the correction unit 66 determines a maximum of respective ratios (maxrate) of contour line lengths between contour points and opposite contour points therefor to shortest route lengths therebetween. At Step S203, the correction unit 66 sets respective two contour points corresponding to the maximum ratio (maxrate), as corrected opening candidate points (mc1 and mc2). In the example illustrated in FIG. 8, a ratio of the contour line length between the contour points 803 and 804 to the shortest route length therebetween is seven and a half (15/2=7.5), and therefore, is the maximum value in the search area. Consequently, the contour points 803 and 804 are set as corrected opening candidate points (mc1 and mc2), respectively.

At Step S204, the correction unit 66 calculates a depth (mdepth) of a depression on the contour line between the corrected opening candidate points (mc1 and mc2). In this case, the correction unit 66 determines the depth (mdepth) by using the same process as the depressed portion determination unit 65 determines the depth (depth) of the depression.

At Step S205, the correction unit 66 determines whether or not a ratio (mdepth/depth) of the depth (mdepth) of the depressed portion determined for the corrected opening candidate points to the depth (depth) of the non-corrected depressed portion exceeds a predetermined threshold (Th4). Note that the threshold (Th4) may be set to, for example, 0.7 to 0.9. Then, if the ratio (mdepth/depth) exceeds the threshold (Th4) ("Yes" at Step S205), the correction unit 66 corrects the depressed portion by replacing the depressed portion with a portion which is not contained in the notable region and which is surrounded by a shortest line between the contour points (mc1 and mc2) and the contour line therebetween, at Step S206. Then, the correction unit 66 terminates the depression correction processing.

Otherwise, if the ratio (mdepth/depth) does not exceed the threshold (Th4) ("No" at Step S205), the correction unit 66 terminates the depression correction processing without correcting the depressed portion.

According to a modification of the embodiment, if the maximum ratio (maxrate) does not exceed a ratio (rate) of the contour line length between the contour points (c1max and c2max) that are arranged in the vicinity of an opening in the depressed portion and that are detected by the depressed portion determination unit 65 to the shortest route length therebetween, the correction unit 66 may terminate the depression correction processing without correcting the depressed portion. Alternatively, if the maximum ratio (maxrate) exceeds the above ratio (rate), the correction unit 66 may skip the determination at Step S205, and correct the depressed portion by replacing the depressed portion into the portion which is surrounded by the shortest line between the contour points (mc1 and mc2) and the contour line therebetween.

Figure 10:
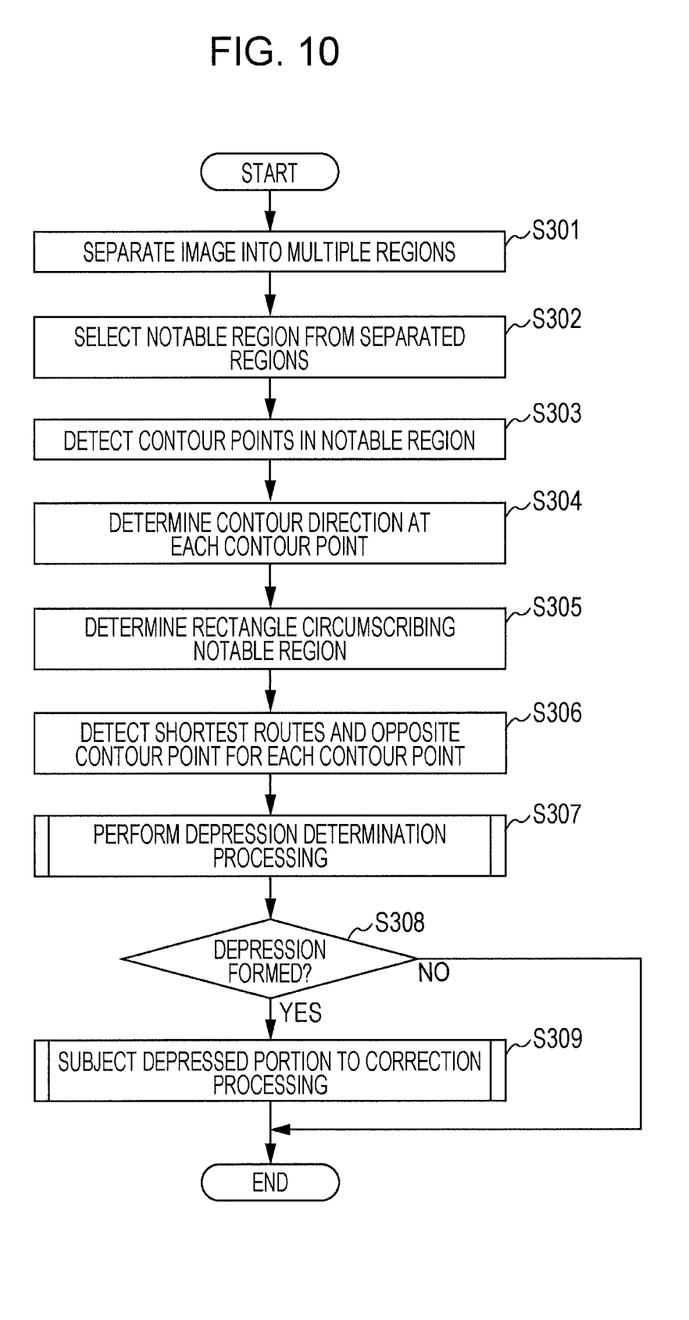
FIG. 10 is a method of operations of the controller during depression detection processing.

FIG. 10 is a method depicting operations of the controller 6 during the depression detection processing. Note that this depression detection processing is performed, for example, every time the controller 6 receives an image from the image sensor 3.

First, at Step S301, the contour extraction unit 61 in the controller 6 separates the image into multiple regions. At Step S302, the contour extraction unit 61 selects a notable region from the separated regions. At Step S303, the contour extraction unit 61 detects contour points in the notable region.

At Step S304, the contour direction detection unit 62 in the controller 6 determines a contour direction at each contour point. At Step S305, the circumscribing region determination unit 63 in the controller 6 determines a rectangle circumscribing the notable region.

At Step S306, the shortest route detection unit 64 in the controller 6 detects shortest routes for each contour point which pass through an external area of the notable region, and an opposite contour point for each contour point. At Step S307, the depressed portion determination unit 65 in the controller 6 performs the depression determination processing.

At Step S308, the controller 6 determines whether or not there is any depressed portion detected. If there is not depressed portions ("No" at Step S308), the controller 6 terminates the depression detection processing. Otherwise, if there is a depressed portion ("Yes" at Step S308), the correction unit 66 in the controller 6 subjects the depressed portion to the correction processing at Step S309. Then, the controller 6 terminates the depression detection processing.

As described above, the image recognition device detects a depressed portion in an image, on the basis of properties in which a depressed portion in a notable region has a contour segment longer than a non-depressed portion, and this contour segment is contained in a rectangle circumscribing the notable region. This enables the image recognition device to detect a depressed portion in an image without relying on information regarding a subject. In addition, even when it is difficult to discriminate between a notable region and another adjacent region because the distribution of pixel values on a depressed portion in the notable region is similar to that of the adjacent region, the image recognition device can detect only a depressed portion that is likely to contain a subject in an image.

Note that the embodiment is not limited to the above-described examples. For example, the controller may not be equipped with the function of the correction unit. In addition, the depressed portion determination unit may determine whether or not a portion that is surrounded by a contour line between two contour points arranged across an opening in a depressed portion and a shortest route therebetween is a depressed portion, only on the basis of a length ratio of the contour line to the shortest route, without considering a depth of the depressed portion.

According to a modification of the embodiment, the depressed portion determination unit may detect a region that is surrounded completely by a notable region and that is not connected to any surrounding region, as a depressed portion. In this case, a whole contour line of the notable region is longer than a contour line which is located on a boundary of the notable region and a surrounding region (thereafter, referred to as a "circumferential boundary"). Furthermore, at least one contour point located on the circumferential boundary does not have an opposite contour point. Accordingly, the depressed portion determination unit detects a cluster made up of contour points in the notable region which is connected to the contour point that does not have an opposite contour point, as a circumferential boundary. If contour points arranged on the circumferential boundary are fewer than all contour points in the notable region, the depressed portion determination unit detects a region surrounded by contour points that are not connected to the circumferential boundary, as a depressed portion.

According to another embodiment, the image recognition device may be provided independently of the image pickup device. For example, the image recognition device may be implemented by a computer or server that can be connected to the image pickup device through a communication network. In this case, the image pickup device transfers the image together with an identification code thereof to the image recognition device through the communication network, every time taking a photograph and generating an image. Then, the image recognition device subjects the received image to the depression detection processing.

A computer program that causes the processor to perform the depression detection processing of FIG. 10 may be provided in the form of a recording medium, such as optical or magnetic recording medium, containing this computer program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image recognition device, comprising:
a processor; and
a memory coupled to the processor, wherein the processor executes a process includes:
detecting a plurality of contour points arranged on a contour line of a given region in an image, detecting a first contour point and a second contour point, in the contour points, and calculating a shortest route between the first and second contour points, the shortest route corresponding to a first shortcut line formed by connecting portions of the contour line across an external area of the given region, and determining, based on a length of the first shortcut line or a length of a first route that extends along the contour line between the first and second contour points, whether or not a portion surrounded by the first shortcut line and the first route, not contained in the given region, is a depressed portion.

2. The image recognition device according to claim 1, wherein the processor determines that the portion surrounded by the first shortcut line and the first route is the depressed portion, when a length ratio of the first route to the shortcut line exceeds a first threshold.

3. The image recognition device according to claim 1, wherein the processor calculates, as a first depression depth, a distance between the shortcut line and one of the contour points which is located on the first route and which is most remote from the shortest route, and determines, when a ratio of the first depression depth to the length of the shortcut line exceeds a second threshold, that the portion surrounded by the first shortcut line and the first route is the depressed portion.

4. The image recognition device according to claim 1, wherein further the processor detects a third contour point and a fourth contour point having a greatest length ratio of a route along the contour line between the pair of contour points to the shortcut line, the each pair being arranged on the first route and corresponding to respective edges of the shortcut line, and determines whether or not to correct the depressed portion by replacing with a portion surrounded by a second route and a second shortest route, the second route extending on the contour line between the third and fourth contour points, the second shortcut line being formed by connecting the third and fourth contour points across the external area of the given region.

5. The image recognition device according to claim 4, wherein the processor calculates, as the second depression depth, the distance between the second shortcut line and one of the contour points which is located on the second route and which is most remote from the second shortcut line, and corrects the depressed portion by replacing with a region surrounded by the second route and the second shortcut line, when a ratio of the second depression depth to a length of the second shortcut line exceeds a third threshold.

6. The image recognition device according to claim 4, wherein the processor corrects the depressed portion by replacing with a portion surrounded by the second route and the second shortcut line, when a length ratio of the second route to the second shortcut line is greater than the length ratio of the first route to the first shortcut line.

7. An image recognition method comprising:

detecting a plurality of contour points arranged on a contour line of a given region in an image;

detecting a first contour point and a second contour point, in the contour points, and calculating a shortest route between the first and second contour points, the shortest route corresponding to a first shortcut line formed by connecting portions of the contour line across an external area of the given region; and determining, based on a length of the first shortcut line or a length of a first route that extends along the contour line between the first and second contour points, whether or not a portion surrounded by the first shortcut line and the first route, not contained in the given region, is a depressed portion.

8. A non-transitory computer-readable recording medium having stored therein a program for causing a computer to execute an image recognition process comprising:

detecting a plurality of contour points arranged on a contour line of a given region in an image;

detecting a first contour point and a second contour point, in the contour points, and calculating a shortest route between the first and second contour points, the shortest route corresponding to a first shortcut line formed by connecting portions of the contour line across an external area of the given region; and determining, based on a length of the first shortcut line or a length of a first route that extends along the contour line between the first and second contour points, whether or not a portion surrounded by the first shortcut line and the first route, not contained in the given region, is a depressed portion.

* * * * *